(No Model.)
E. H. GRAVES.
VETERINARY PARTURITION HOOK.
No. 472,536. Patented Apr. 12, 1892.
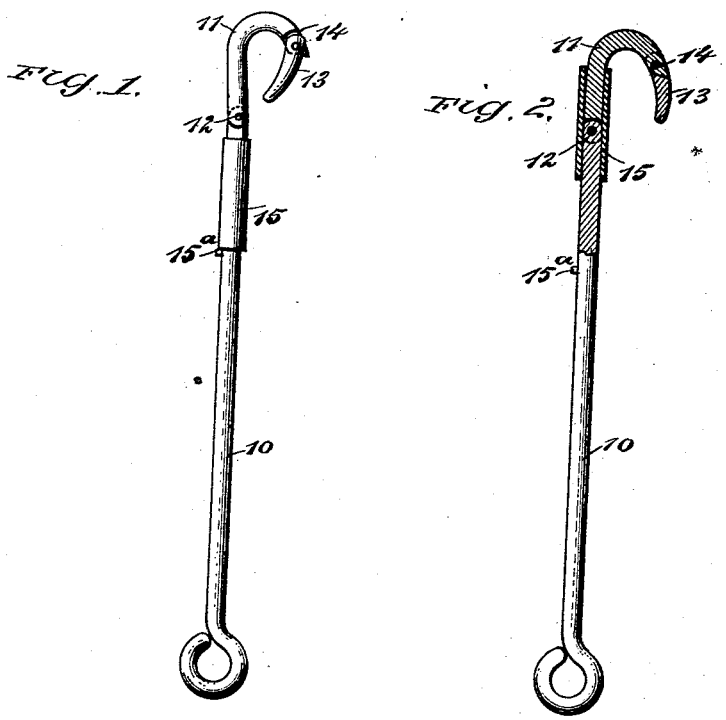
WITNESSES:
W. R. Davis
C. Sedgwick
INVENTOR:
E. H. Graves
BY Munn & Co.
ATTORNEYS

UNITED STATES PATENT OFFICE.

EPHRAIM H. GRAVES, OF APPLETON, WISCONSIN.

VETERINARY PARTURITION-HOOK.

SPECIFICATION forming part of Letters Patent No. 472,536, dated April 12, 1892.

Application filed July 29, 1891. Serial No. 401,031. (No model.)

*To all whom it may concern:*

Be it known that I, EPHRAIM H. GRAVES, of Appleton, in the county of Outagamie and State of Wisconsin, have invented a new and Improved Parturition-Hook, of which the following is a full, clear, and exact description.

My invention relates to improvements in obstetrical instruments which are adapted to be used in parturition and which are especially intended for use on dumb animals.

The object of my invention is to produce a jointed hook which may be folded and easily inserted in an animal, which may be quickly opened and adjusted, and by means of which an animal may without injury be quickly relieved of her young.

To this end my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a side elevation of the hook with the binding-sleeve slipped up on the handle. Fig. 2 is a sectional view of the hook with the binding-sleeve slipped down to lock the hook proper in open position.

The hook 10 has an elongated shank or handle, which at its lower end is hinged to the first joint 11 of the hook proper, as shown at 12, and this joint can swing in opposite directions on the shank. The second joint 13, which forms the point of the hook, is hinged to the first joint at 14 and can swing inward only, as in Fig. 1. A binding-sleeve 15 is used to hold the first joint 11 in open position and fix it rigidly in relation to the shank. This sleeve slides on the shank and first joint, which are of the same diameter, and its movement on the shank is limited by a stud $15^a$.

The hook may be thrust into the animal in a partially-doubled position, and by pushing with the thumb on the sleeve it may be made to slide upon the first joint 11, thus opening and fastening the hook. The second joint is self-acting, and when it engages the fœtus and is withdrawn it straightens out into the position shown in Fig. 2. It will be seen that the hook may be easily doubled up and inserted, and when the sleeve is pushed down the hook is as strong as if made of a single piece.

Having thus described my invention, I claim as new and desire to secure by Letters Patent—

1. The combination, with an elongated shank, of a hook hinged to the shank and a sleeve held to slide over the joint of the shank and hook, substantially as shown and described.

2. The combination, with an elongated shank, of a jointed hook hinged to the shank and a sleeve to slide over the joint of the shank and hook, substantially as shown and described.

EPHRAIM H. GRAVES.

Witnesses:
O. A. MILLARD,
J. WILGER.